US008373706B2

(12) United States Patent
Girard

(10) Patent No.: US 8,373,706 B2
(45) Date of Patent: Feb. 12, 2013

(54) REAL-TIME GOAL-DIRECTED PERFORMED MOTION ALIGNMENT FOR COMPUTER ANIMATED CHARACTERS

(75) Inventor: Michael Girard, Palo Alto, CA (US)

(73) Assignee: Autodesk, Inc., San Rafael, CA (US)

( * ) Notice: Subject to any disclaimer, the term of this patent is extended or adjusted under 35 U.S.C. 154(b) by 1059 days.

(21) Appl. No.: 12/128,589

(22) Filed: May 28, 2008

(65) Prior Publication Data
US 2009/0295808 A1    Dec. 3, 2009

(51) Int. Cl.
*G06T 13/00* (2011.01)
(52) U.S. Cl. .................. 345/474; 345/473; 706/47
(58) Field of Classification Search .............. 706/47
See application file for complete search history.

(56) References Cited

U.S. PATENT DOCUMENTS

| | | | |
|---|---|---|---|
| 5,864,342 A | 1/1999 | Kajiya et al. | |
| 5,982,389 A | 11/1999 | Guenter et al. | |
| 5,999,195 A | 12/1999 | Santangeli | |
| 6,011,562 A | 1/2000 | Gagne et al. | |
| 6,057,859 A | 5/2000 | Handelman et al. | |
| 6,126,449 A | 10/2000 | Burns | |
| 6,208,357 B1 | 3/2001 | Koga et al. | |
| 6,535,215 B1 | 3/2003 | DeWitt et al. | |
| 6,587,574 B1 | 7/2003 | Jeannin | |
| 6,608,624 B1 | 8/2003 | Wang | |
| 7,525,546 B2 * | 4/2009 | Herbrich et al. ............. 345/474 |
| 2001/0048441 A1 | 12/2001 | Mochizuki et al. | |
| 2002/0118194 A1 | 8/2002 | Lanciault et al. | |
| 2004/0012594 A1 | 1/2004 | Gauthier et al. | |
| 2004/0160445 A1 | 8/2004 | Whatmough | |
| 2005/0001842 A1 | 1/2005 | Park et al. | |
| 2005/0071306 A1 * | 3/2005 | Kruszewski et al. ........... 706/47 |
| 2005/0231512 A1 | 10/2005 | Niles et al. | |
| 2006/0214934 A1 | 9/2006 | Foote | |
| 2010/0002908 A1 | 1/2010 | Miyamoto et al. | |

OTHER PUBLICATIONS

Ménardais, S., Kulpa, R., Multon, F., and Arnaldi, B. 2004. Synchronization for dynamic blending of motions. In Proceedings of the 2004 ACM Siggraph/Eurographics Symposium on Computer Animation (Grenoble, France, Aug. 27-29, 2004). Symposium on Computer Animation. Eurographics Association, Aire-la-Ville, Switzerland, 325-335.
Heck, R., Kovar, L. and Gleicher, M. (Sep. 2006), Splicing Upper-Body Actions with Locomotion. Computer Graphics Forum, 25: 459-466. doi: 10.1111/j.1467-8659.2006.00965.x.
Office Action U.S. Appl. No. 11/833,926 dated Sep. 9, 2010.
Office Action, U.S. Appl. No. 11/833,890 dated Dec. 16, 2010.
Office Action, U.S. Appl. No. 11/972,006 dated Feb. 1, 2011.

(Continued)

*Primary Examiner* — Xiao M. Wu
*Assistant Examiner* — Phi Hoang
(74) *Attorney, Agent, or Firm* — Patterson & Sheraton, LLP

(57) ABSTRACT

A method for real-time, goal-directed performed motion alignment for computer animated characters. A sequence of periodic locomotion may be seamlessly aligned with an arbitrarily placed and rotated non-periodic performed motion. A rendering application generates a sampling of transition locations for transition from a locomotion motion space to a performed motion space. The sampling is parameterized by control parameters of the locomotion motion space. Based on the location and rotation of a goal location at which the performed motion is executed, a particular transition location may be selected to define a motion plan to which a performed motion sequence may then appended. Advantageously, by utilizing a look-up of pre-computed values for the control parameters of the motion plan, the rendering application may minimize the computational cost of finding the motion plan to move the character to a location to transition to a performed motion.

20 Claims, 10 Drawing Sheets

OTHER PUBLICATIONS

Laszlo et al., "Limit Cycle Control and It's Application to the Animation of Balancing and Walking," 1996, Proceedings of the 23rd Annual Conference on Computer Graphics and Interactive Techniques.

Rezk-Salama et al., "Interactive Exploration of Volume Line Integral Convolution Based on 3D-Texture Mapping," VIS '99 Proceedings of the Conference on Visualization '99, pp. 233-241.

Office Action in U.S. Appl. No. 11/833,953, mailed Mar. 14, 2011.

Egges, A., et al., "Personalised real-time idle motion synthesis," Computer Graphics and Applications, 2004, Proceedings, 12th Pacific Conference on, Oct. 6-8, 2004, doi: 10.1109/PCCGA.2004.1348342.

International Search Report, Aug. 28, 2008.

International Search Report, Sep. 4, 2008.

Ashraf, G., et al. "Constrained framespace interpolation," Computer Animation, 2001. The Fourteenth Conference on Computer Animation. Proceedings, vol., no., pp. 61-72, 2001.

Heck et al., "Parametric Motion Graphs", ACM SIGGRAPH Symposium on Interactive 3D Graphics, 2007, pp. 1-8.

Heck et al., "Parametric Motion Graphs", Posters and Demos, Eurographics/ ACM SIGGRAPH Symposium on Computer Animation (2006), pp. 1-2.

Cooper et al., "Active Learning for Real-Time Motion Controllers", ACM Transactions on Graphics 26(3) (SIGGRAPH 2007). Aug. 2007, pp. 1-7.

Jerry Edsall, "Animation Blending: Achieving Inverse Kinematics and More", Gamasutra, Jul. 4, 2003, http://www.gamasutra.com/features/20030704/edsall_01.shtml, 20 pages.

Wiley et al., "Interpolation Synthesis of Articulated Figure Motion", 1997 IEEE Computer Graphics and Applications, pp. 39-45.

Bruderlin et al., "Motion Signal Processing", SIGGRAPH 1995, ACM Press, New York, NY, pp. 97-104.

Kwon et al., "Motion Modeling for On-Line Locomotion Synthesis", Eurographics/ ACM SIGGRAPH Symposium on Computer Animation, Jul. 29-31, 2005, Los Angeles, CA, pp. 29-38, 346.

Rose et al., "Efficient Generation of Motion Transitions Using Spacetime Constraints", SIGGRAPH, ACM Press, New York, 1996. NY, pp. 147-154.

Rose et al., "Verbs and Adverbs: Multidimensional Motion Interpolation Using Radial Basis Functions", http://graphics.cs.cmu.edu/nsp/course/15-464/Fall05/papers/rose98verbs.pdf, 1998. pp. 1-17.

Kovar et al., "Flexible Automatic Blending with Registration Curves", Eurographics/SIGGRAPH Symposium on Computer Animation (2003), 11 pages.

Kovar et al., "Automated Extraction and Parameterization of Motions in Large Data Sets", ACM Trans. Graph, 23(3), pp. 559-568, Aug. 2004.

Lau, et al., "Precomputed Search Trees: Planning for Interactive Goal-Driven Animation", Eurographics/ ACM SIGGRAPH Symposium on Computer Animation, 2006. Vienna, Austria.

Shin et al., "Fat Graphs: Constructing an Interactive Character with Continuous Controls", Eurographics/ACM SIGGRAPH Symposium on Computer Animation, Sep. 2006, pp. 291-298.

* cited by examiner

REAL-TIME GOAL-DIRECTED PERFORMED MOTION ALIGNMENT FOR COMPUTER ANIMATED CHARACTERS

BACKGROUND OF THE INVENTION

1. Field of the Invention

The present invention generally relates to computer software. More specifically, the present invention relates to a rendering application configured to provide real-time, goal-directed performed motion alignment for computer animated characters.

2. Description of the Related Art

The term, "rendering application," refers to a broad variety of computer-based tools used by architects, engineers, animators, video game designers, and other graphics and design professionals. Rendering is the process of generating an image from a model by means of computer programs and/or specified hardware.

A desired feature of rendering applications is the ability to generate frames of an animation sequence in real-time using one or more motion clips. Typically, motion clips are created using a motion capture system, where a human motion capture actor wears markers near each joint to identify a motion by positions or angles between the markers. The markers are tracked to sub-millimeter positions. Motion capture computer software records the positions, angles, velocities, accelerations, and impulses of the markers, providing an accurate digital representation of the actor's motion. The digital representation is then used to generate a motion clip.

In the video game industry, many game products include goal-driven characters that are not controlled directly by the player of the game. These characters are called "non-player characters" or "NPCs." The most popular games (sports, role-playing, strategy, and first person shooters) make heavy use of NPCs to provide the key action elements in the game. For example, in a football video game, each of the characters on an opposing computer-controlled team is an NPC. However, creating game character motions for both player-controlled characters and NPCs that are both engaging and appear realistic to the user has proven to be quite difficult. Ideally, a user of a video game should see the character motion as being "alive" or "correct," without motion artifacts that appear to jar a character out of context. More specifically, motion artifacts are particularly apparent in animation sequences that transition from a sequence of locomotion to a performed motion.

"Locomotion" refers to periodic, repetitive motions, such as walking, running, jogging, creeping, swimming, and the like. Locomotion may be goal-directed, meaning that a character intelligently navigates a terrain to reach a defined goal while following an unspecified path around obstacles within the terrain. In contrast, "performed motion" refers to motions designed for specific objects, locations, or orientations in the environment. Performed motions may be any motion that is not locomotion. Examples of performed motion include climbing ladders or stairs, sitting down in a chair, fighting with other characters, shooting a gun, and the like.

Prior art techniques for linking a locomotion sequence to a performed motion rely on "motion graphs." A motion graph is a network of discrete motion clips with connected transitions that linearly blend from one clip into another clip. A problem with using motion graphs to make the transition to a performed motion is that the generated motion may suffer from motion artifacts that cause the appearance of sliding, jumping, skipping, or other changes that look unnatural.

Other prior art methods provide techniques for causing a character to move to an arbitrary point in a scene without introducing substantial motion artifacts. However, moving a character to a desired location does not address the problem of ensuring that the character is properly oriented or aligned in order to initiate the performed motion sequence. Thus, with these prior art methods, motion artifacts are introduced when transitioning to the performed motion.

Accordingly, there remains the need in the art for a technique for generating realistic animation sequences that include performed motions.

SUMMARY OF THE INVENTION

Embodiments of the present invention provide a method for generating a behavioral gridmap for aligning a locomotion sequence with a performed motion sequence. A rendering application generates a behavioral motion space from a locomotion motion space and a performed motion space. The locomotion motion space includes one or more motion clips depicting a character performing a periodic motion sequence, and the performed motion space includes one or more motion clips depicting the character performing a performed motion sequence. The rendering application generates a set of registration curves representing transitions from the locomotion motion space to the performed motion space. The rendering application generates a search space that includes parametric motion datapoints, each being associated with a motion plan defined by a set of control parameters and a rotation of a goal location. The search space is filtered to generate a first behavioral gridmap.

One advantage of the systems and methods described herein is that they provide a real-time solution to the problem of aligning a performed motion space with a locomotion motion space. Another advantage is that using performance location maps to solve for additional rotations of a goal location consumes relatively little storage space relative to storing multiple behavioral gridmaps representing additional rotations of the goal location. Thus, multiple rotations of performed motion alignment may also be calculated in real-time, without storing multiple behavioral gridmaps.

DETAILED DESCRIPTION OF THE PREFERRED EMBODIMENTS

Figure 1A:
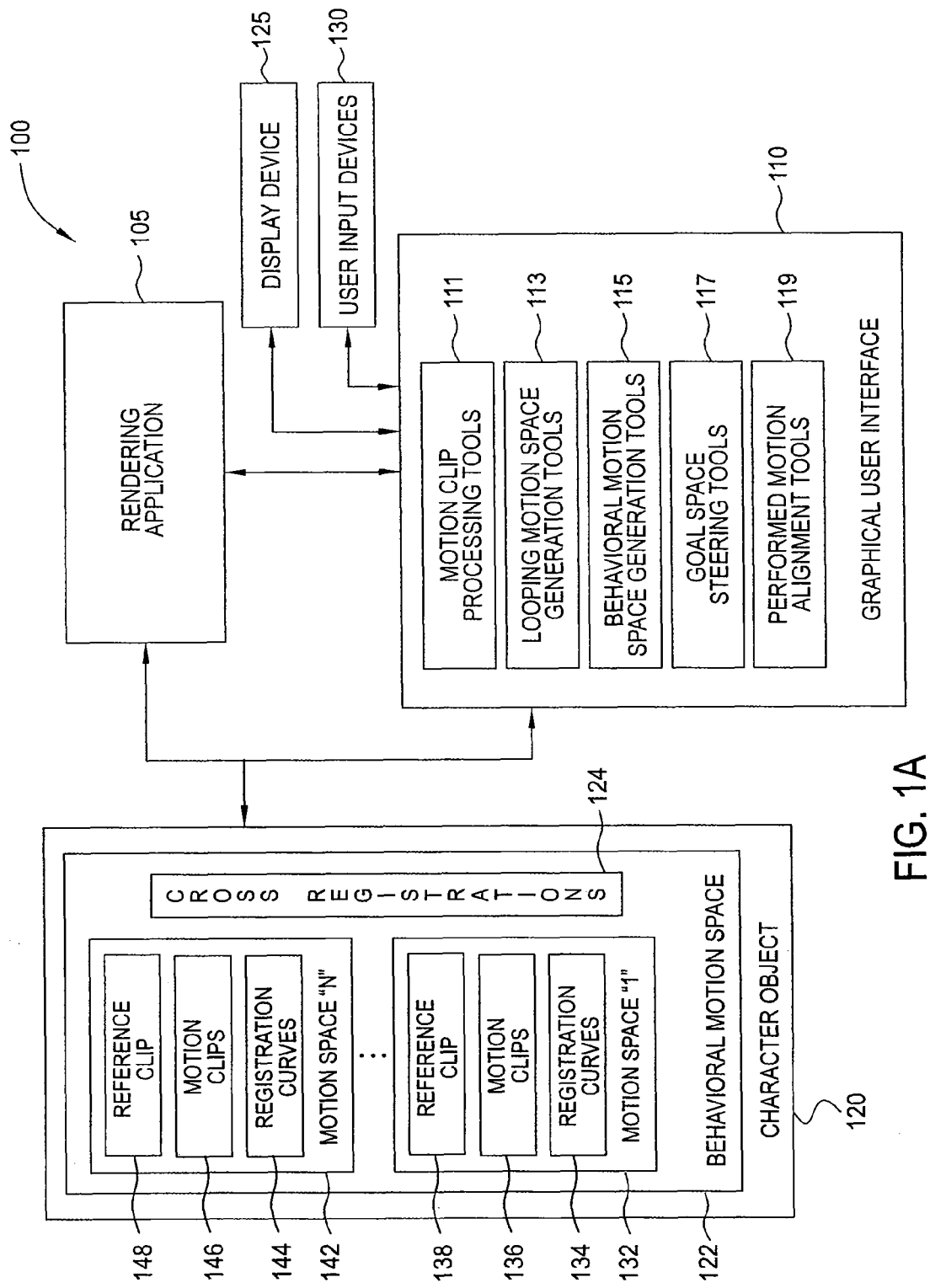
FIG. 1A is a block diagram illustrating components of a computer system configured to implement one or more aspects of the present invention.

FIG. 1A is a block diagram illustrating components of a computer system 100 configured to implement one or more aspects of the present invention. The computer system 100 can be any type of computing system, including a desktop computer, a server computer, a laptop computer, a tablet computer, and the like. Software applications described herein, however, are not limited to any particular computing system and may be adapted to take advantage of additional computing systems as they become available.

As shown, the computer system 100 may include a rendering application 105, a graphical user interface 110, a character object 120, a display device 125, and user input devices 130. Those skilled in the art will recognize that the components shown in FIG. 1 are simplified to highlight aspects of the present invention and that a typical rendering application 105 and GUI interface 110 may include a broad variety of additional tools and features used to compose and manage the character object 120. Additionally, the components of computer system 100 may include software applications executing on distributed systems communicating over computer networks, such as local area networks or large, wide area networks, like the Internet. For example, the graphical user interface 110 may include a software program executing on a client computer system communicating with the rendering application 105 residing at another physical location.

Rendering application 105 may be configured to allow users interacting with GUI interface 110 to compose character object 120. Accordingly, rendering application 105 and GUI interface 110 may include programmed routines or instructions allowing users to create, edit, load, and save the character object 120. Typically, user input devices 130 include a mouse, a pointing device, a keyboard, a joystick, or a video game controller, and display device 125 may be a CRT or LCD display.

A behavioral motion space 122 may define the range of motion of the character object 120. The behavioral motion space 122 may include a plurality of motion spaces 132, 142. Illustratively, each motion space 132, 142 includes motion clips 136, 146, registration curves 134, 144, and a reference clip 138, 148. In one embodiment, motion clips 136, 146 may be pre-defined motion clips created using a motion capture system. Within a given motion space, each of the motion clips are of the same motion "type," e.g., running, walking, or sitting in a chair, among others. In another embodiment, users of the rendering application 105 may create new motion clips 136, 146 manually by creating a sequence of key-frames using standard three-dimensional (3D) computer animation key-framing tools.

Motion clips 136, 146 may include a sequence of frames of geometrical primitives such as points, lines, curves, and polygons that collectively depict character object 120 performing some form of motion. For example, motion clips 136, 146 may include a sequence of frames that depict a wire-frame skeleton of a human engaging in a walking motion. The character's skeleton motion may be described as a hierarchical set of bones connected by moving joint angles as the character's root body position travels through its virtual 3D environment. A "skeletal deformation" of a character model's body surface geometry along with texture mapping may then be used to give the geometrical primitives that make up character object 120 a life-like appearance. As is known, texture mapping is a method of adding detail, surface texture, or color to a computer-generated graphic or model.

Registration curves 134, 144 within each motion space 132, 142 may define a relationship between individual frames of a first motion clip and corresponding frames of a second motion clip in the motion space 132, 142. As is known, registration curves 134, 144 provide a data structure specifying the relationships involving the timing, local coordinate frame, and constraints between frames of the first motion clip and corresponding frames of the second motion clip.

Additionally, registration curves 134, 144 may be used to expand the range of motion that can be automatically blended from the motion clips of a motion space without requiring manual intervention. For example, one motion clip may depict a walking character turning 30 degrees to the right and a second motion clip may depict the walking character turning 30 degrees to the left. The registration curve created for such a first and second motion clip may be used for generating an animation clip blended from the first and second motion clips. Further, depending on how frames from motion clips are blended, the resulting animation clip may show the character moving anywhere within the motion space between the two motion clips. Thus, in this example, the resulting animation clip may show the character walking while gradually turning anywhere from one extreme (30 degrees to the right) to the other (30 degrees to the left) or anywhere in between.

As described in greater detail below, motion spaces of different motion types may be used as building blocks to create a behavioral motion space. In one embodiment, motion spaces may contain motion clips of characters performing locomotion or performed motion. For example, a first motion space may include motion clips of a character walking in different directions; whereas, a second motion space may include motion clips of a character sitting in a chair that is oriented in various rotations. Illustratively, each motion space may have reference clips 138, 148. The reference clips 138, 148 may provide a representative clip of the motion space. For a motion space representing a walking character motion, the reference clip may depict the character walking in a generally straight line for a number of steps. Similarly, for a motion space representing a character sitting down in a chair, the reference clip may depict the character approaching a chair and turning 180 degrees to sit down in the chair. These reference clips may be used to generate cross registration curves between two motion spaces, thus creating a behavioral motion space.

Cross registrations 124 may be made between motions clips 136, 146 of multiple motion spaces 132, 142, including the reference clips 138, 148, to synchronize the motion spaces 132, 142 included in the behavioral motion space 122. Similar to registration curves 134, 144 within a motion space, the cross-registrations 124 are used to blend different types of motion represented by various motion spaces 132, 142. In one embodiment, additional cross registrations 124 may be made between "non-reference clip" motion clips, allowing for more accurate blending across motion spaces. For example, these additional cross registrations may more accurately blend a time step of the motion, i.e., how far to advance through a motion space from frame-to-frame when blending between different motion types.

Graphical user interface 110 provides tools used to manipulate character object 120. As shown, graphical user interface 110 includes motion clip processing tools 111, looping motion space generation tools 113, behavioral motion space generation tools 115, goal space steering tools 117, and performed motion alignment tools 119. Those skilled in the art will recognize that the tools of GUI interface 110 are simplified to highlight aspects of the present invention and that a typical rendering application 105 and GUI interface 110 may include a broad variety of additional tools and features used to compose and manipulate an animated character object 120.

Motion clip processing tools 111 may provide GUI elements that allow a user to define and modify physical, display, and meta properties of motion clips 136, 146. As stated, motion clips 136, 146 may provide a sequence of frames showing the character performing some form of motion.

Looping motion space generation tools 113 may allow a user to generate an animation sequence for the character object 120 that extends a locomotion portion of the animation sequence indefinitely. Each motion clip, and hence each motion space that includes a set of motion clips, has a finite length. As a result, if a user generates an animation sequence by blending the frames of two motion clips, then the resulting animation sequence also has a finite length. In many applications that involve character animation, especially those that involve NPC animation, characters may move around the scene for an arbitrary period of time. Accordingly, embodiments of the invention provide a looping motion space that may be used to render the character object 120, where the character object 120 perform an arbitrary number of motion cycles, particularly a periodic locomotion such as when a human character walks, jogs, or runs, among others. In one embodiment, to create a looping motion space, the motion clips in a motion space are processed to include the same number of locomotion cycles and to have matching first and last frames. Registration curves between the processed motion clips may be generated, allowing for the processed motion clips to be seamlessly blended together, as described above. These blended motions can be "looped" any number of times, without generating any abrupt changes in the character's motion.

Behavioral motion space generation tools 115 may be used to combine motion clips 136, 146 of multiple motion spaces 132, 142 into a behavioral motion space 122. Behavioral motion space generation tools 115 "stitch together" the motion spaces 132, 142 so that the frames of motion of various styles may be synchronized, combined, and continuously varied by means of blend weights for each motion space 132, 142. In other words, the style of motion of a character may be seamlessly and convincingly changed at any time as the character moves through the environment. As stated, similar to the way blending motion clips within a motion space may be used to vary the path of a character, blending motion spaces into a behavioral motion space may be used to transition the character from one style of motion to another. For example, a motion sequence may depict a character transitioning from walking to jogging to running. Additionally, different types of hybrid motion may be created by blending different motion types, e.g., a "running-walk." Thus, rather than providing a handful of sharply distinct types of motion, the rendering application 105 is configured to provide broad ranges of motion that may be blended to create the behavioral motion space 122, resulting in rendered character motions with more realistic appearances.

In one embodiment, a rendering application 105 may include goal space steering tools 117. A goal is a target to which a character desires to move. The goal can be either stationary or moving. Goal space steering tools 117 may vary the blending weight of motion clips within a locomotion motion space to continuously turn a character in real-time towards a stationary or moving goal. Due to the irregular curvature of blended motion clip paths, the relationship between blending weight and direction is not analytically computable. For example, each footstep taken by a character should not be perfectly smooth along a line or arc, because without natural irregularities in the motion, such as lateral shifts in balance, differences in stride length, and deviations in path direction, the character's motion would be perceived as being "robotic." In short, motion data cannot be described by a closed-form parametric equation that gives motion direction as a function of blending weight. Given the irregularity of the motion data, for each frame of the rendered animation sequence, the correct blending weight coefficients may be used in conjunction with registration curves 134, 144 and cross registrations 124 to steer a character toward a desired goal location. In one embodiment, the goal location may define a location in an environment at which the character initiates a performed motion that may be specifically oriented within the environment.

Performed motion alignment tools 119 may allow a user to align a sequence of locomotion with an arbitrarily placed and rotated performed motion. As discussed in greater detail below, the alignment is based on pre-computing coordinated footstep plans that connect with rotated variations of the performed motion within a contiguous and bounded region.

Figure 1B:
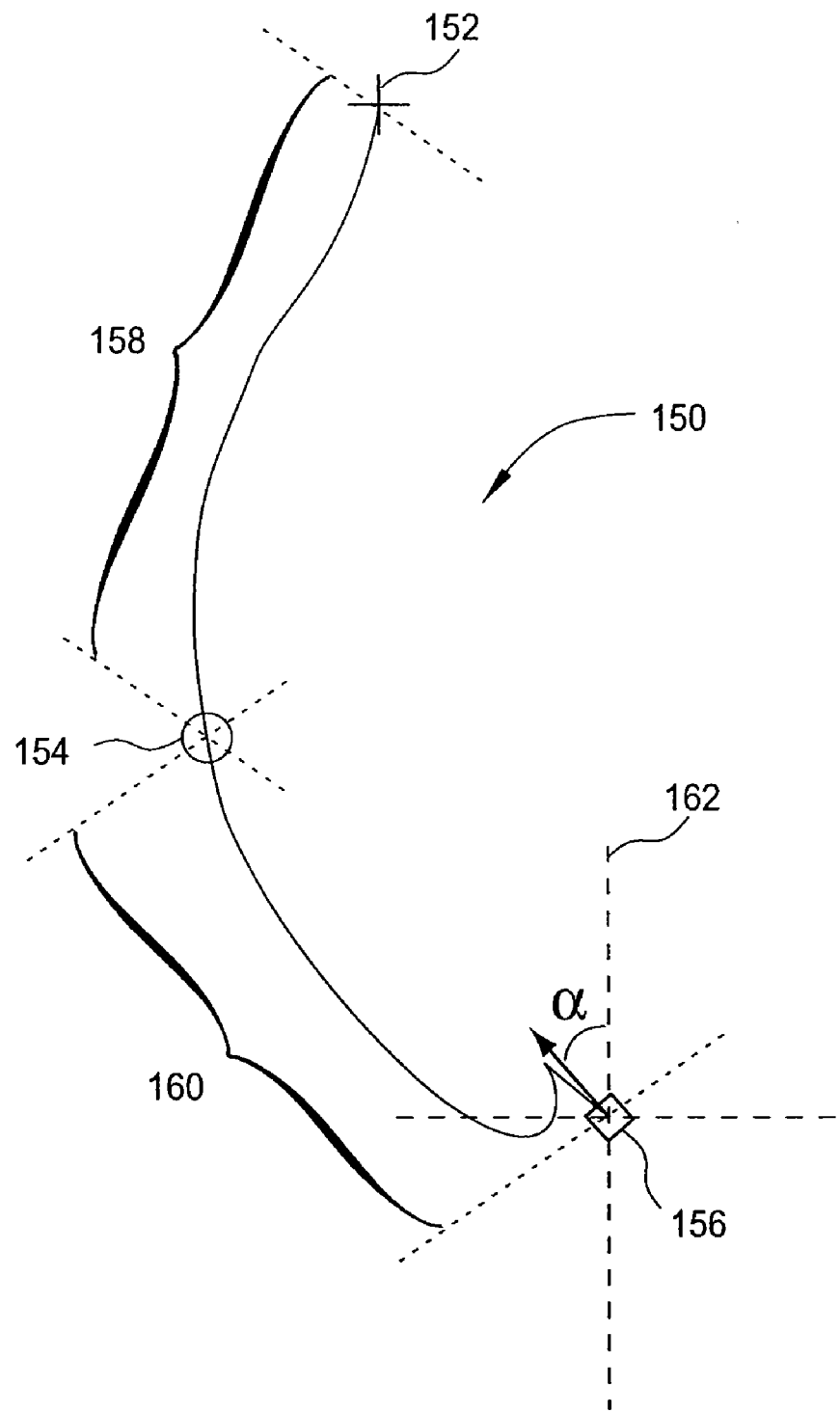
FIG. 1B is top view of a motion sequence, according to one embodiment of the invention.

FIG. 1B is top view of a motion sequence 150, according to one embodiment of the invention. As shown, motion sequence 150 includes a motion plan 158 and a performed motion sequence 160. A character may traverse the motion plan 158, beginning at an initial location 152, and then transition to the performed motion sequence 160 at a transition location 154.

After the transition location 154, the character executes the performed motion sequence 160. The performed motion sequence 156 terminates with the character executing some performed motion at a goal location 156. The goal location 156 may have a rotation ($\alpha$) with respect to a coordinate grid 162. For example, the performed motion sequence 160 may begin with the character taking several locomotion steps and may terminate with the character rotating to sit down in a chair. The path of the motion sequence 150, including both the motion plan 158 and the performed motion sequence 160, is based on the rotation ($\alpha$) of the goal location 156. As described in greater detail below, in one embodiment, goal location 156 and the associated performed motion rotation ($\alpha$) may be a parametric motion datapoint within a behavioral gridmap. A parametric motion datapoint may define control parameters that parameterize the motion plan 158.

Figure 2:
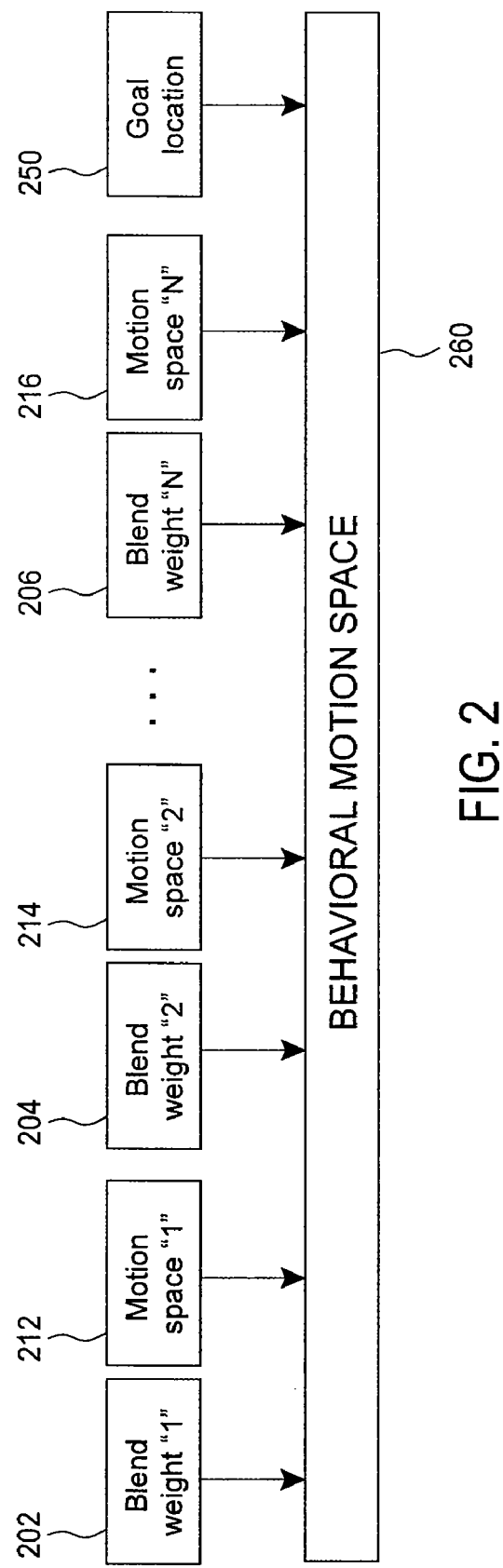
FIG. 2 is a conceptual diagram of a behavioral motion space, according to one embodiment of the invention.

FIG. 2 is a conceptual diagram of a behavioral motion space 260, according to one embodiment of the invention. As shown, behavioral motion space 260 includes a plurality of motion spaces 212, 214, 216, associated blend weights 202, 204, 206, respectively, and a goal location 250. The goal location 250 and blend weights 202, 204, 206 may be used to combine motion clips from motion spaces 212, 214, 216 to render animation frames for behavioral motion space 260. For example, motion space 212 may represent a walking motion space, motion space 214 may represent a jogging motion space, and motion space 216 may represent a running motion space. Blend weight 202 may be set to 0.3, blend weight 204 may be set to 0.7, and blend weight 206 may be set to 0.0. Using these exemplary blend weights, the character may be rendered to appear to move towards the goal location 250, such that three-tenths of the character appearance is contributed by the motion clips of the walking motion space 212, and seven-tenths of the character appearance is contributed by the jogging motion space 214. In this example, the clips of the running motion space 216 do not contribute to the final motion of the character because the blending weight for this motion space is set to 0.0.

Figure 3:
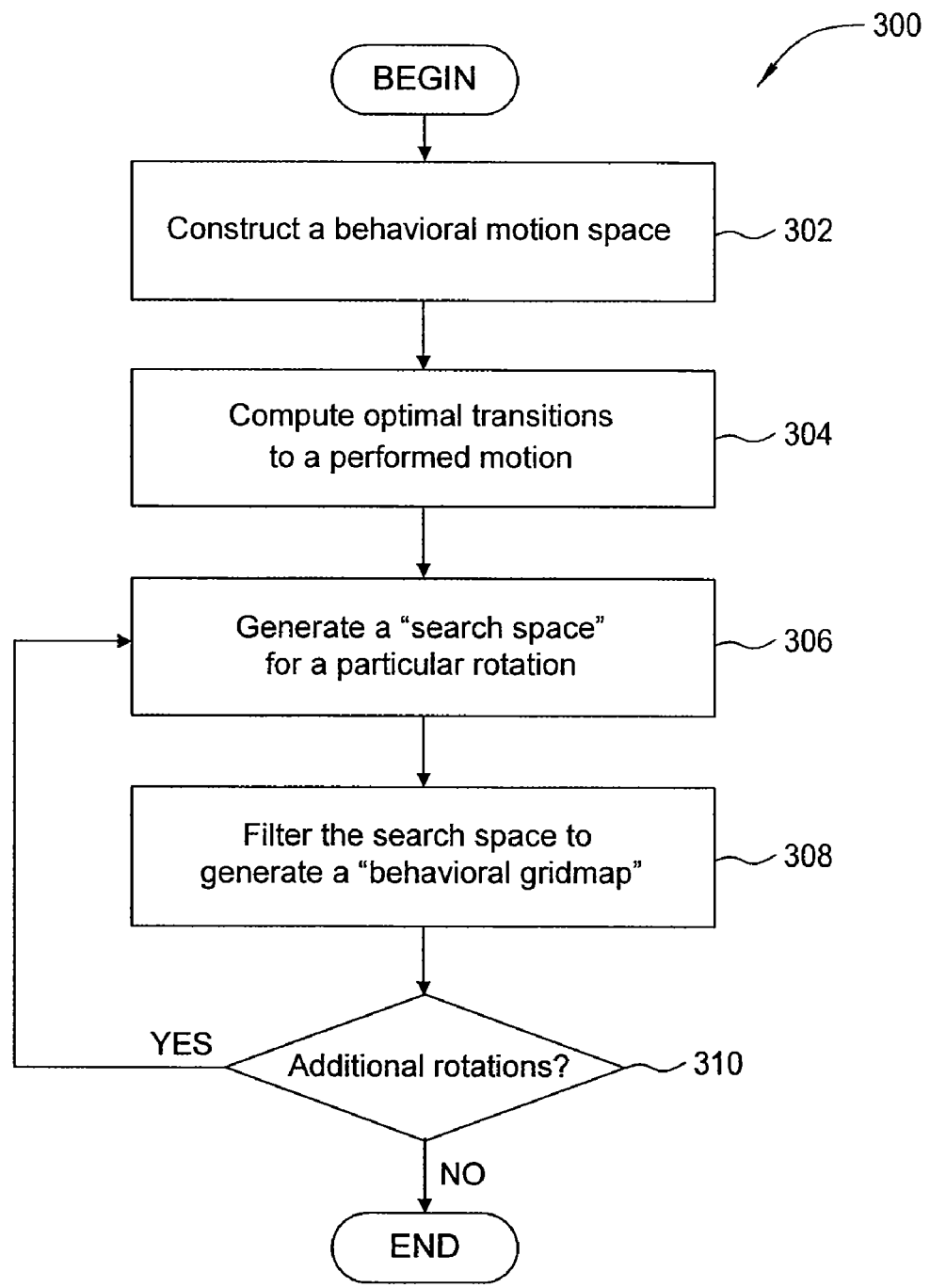
FIG. 3 is a flow diagram of method steps for generating one or more behavioral gridmaps for aligning a locomotion sequence with a performed motion, according to one embodiment of the invention.

FIG. 3 is a flow diagram of method steps for generating one or more behavioral gridmaps for aligning a locomotion sequence with a performed motion, according to one embodiment of the invention. Persons skilled in the art will understand that, even though the method is described in conjunction with the systems of FIGS. 1A, 1B, and 2, any system configured to perform the method steps, in any order, is within the scope of the present invention.

As shown, method 300 begins at step 302, where a rendering application constructs a behavioral motion space. In one embodiment, the behavioral motion space is constructed having at least four motion spaces, including two locomotion motion spaces having different stride lengths, a performed motion space, and a corresponding mirrored performed motion space. For example, in an animation involving a walking character, the first locomotion motion space may have a first stride length, and the second locomotion motion space may have a second stride length that is longer than the first stride length. By blending the first and second locomotion motion spaces, locomotion sequences having stride lengths that vary between the first and second stride lengths can be created. The ability to create motion sequences with varying stride lengths allows for the creation of motion plans to orient the character in a position from which to initiate a transition to either the performed motion space or the mirrored performed motion space. For example, the character may enter a room and desire to sit down in chair at the opposite side of the room. As the character approaches the chair, the character may need to shorten its stride length to achieve the proper positioning to initiate the performed motion of sitting down in the chair. The shortened stride length can be achieved by increasing the weighted blending of the locomotion motion space having the shorter stride length. Additionally, generating motion sequences with shortened stride lengths may allow the character to transition to a performed motion space at positions within the behavioral motion space that are not specifically at one of "normal" footsteps of the first or second motion space. For example, the character may transition to a performed motion space at a position that is halfway between the normal stride length of the first and second locomotion motion spaces.

The mirrored performed motion space depicts a character executing the same performed motion as depicted in the performed motion space, but the performed motion is initiated on the opposite side of the character's body. For example, the performed motion space may represent a character sitting down in a chair while pivoting on a right side of the body; whereas, the mirrored motion space may represent the character sitting down in a chair while pivoting on the left side of the body. In one embodiment, the mirrored performed motion space is a reflection of the performed motion space initiated on the other side of the body. In alternative embodiments, the mirrored performed motion space may be a separate and distinct motion space having unique motion capture irregularities that may be used to increase the realism of the performed motion.

At step 304, the rendering application computes optimal transitions to a performed motion. In one embodiment, optimal transitions between a locomotion motion space and a performed motion space may be computed by generating a set of K registration curves, where K equals a number of cycles in the locomotion motion space. In the example of a walking character, a cycle includes two steps; thus, a locomotion motion space having six steps would include three cycles. Suppose that a first locomotion motion space represents a walking motion, and a first performed motion space represents sitting down in a chair. Suppose further that the first locomotion motion space includes three cycles (six steps), and the first step of the first locomotion motion space is a step with the right foot. Also, suppose that each of the three steps with the right foot is slightly different based on motion capture irregularities and that the first performed motion space begins with a step on the right foot. In such a scenario, K=3, and registration curves would be computed between each of the three right-footed steps in the locomotion motion space and the first step of the first performed motion space. This set of registration curves would allow the character to make the transition to the performed motion at any one of the three right-footed steps of the locomotion motion space.

Similar registration curve calculations may be made for transitioning to a second performed motion space, consisting of sitting down in a chair from the left foot using the mirrored performed motion space. Additionally, by blending the first and second locomotion motion spaces (where the second locomotion space is defined by a different stride length than the first locomotion space), the character may transition to a performed motion space at any position "between" the footsteps delineated by the first and second motion spaces, as described above.

At step 306, the rendering application generates a search space for a particular rotation at which the performed motion is executed. Referring again to the example of a character walking and then sitting down in a chair, a search space may include a high-density sampling of pre-computed parametric motion datapoints that represent coordinated footstep plans varied by stride length, curvature of path, and number of steps. The parametric motion datapoints in the search space represent the final locations at which a performed motion achieves goals with respect to other objects in the environment, such as the location/orientation of a chair when sitting down or the location/orientation of a ladder when climbing a ladder. In order for a character to be able to reach to a performed motion at an arbitrary final location, a high-density sampling may be performed to compute motion plans parameterized by control parameters, like stride length, curvature of path, and number of steps. The high-density sampling of possible final locations may be desirable because the irregularity of the data causes difficulty when predicting where a character will be located using a particular stride length, curvature of path, and number of steps. An exemplary search space 400 is shown in FIG. 4.

Figure 4:
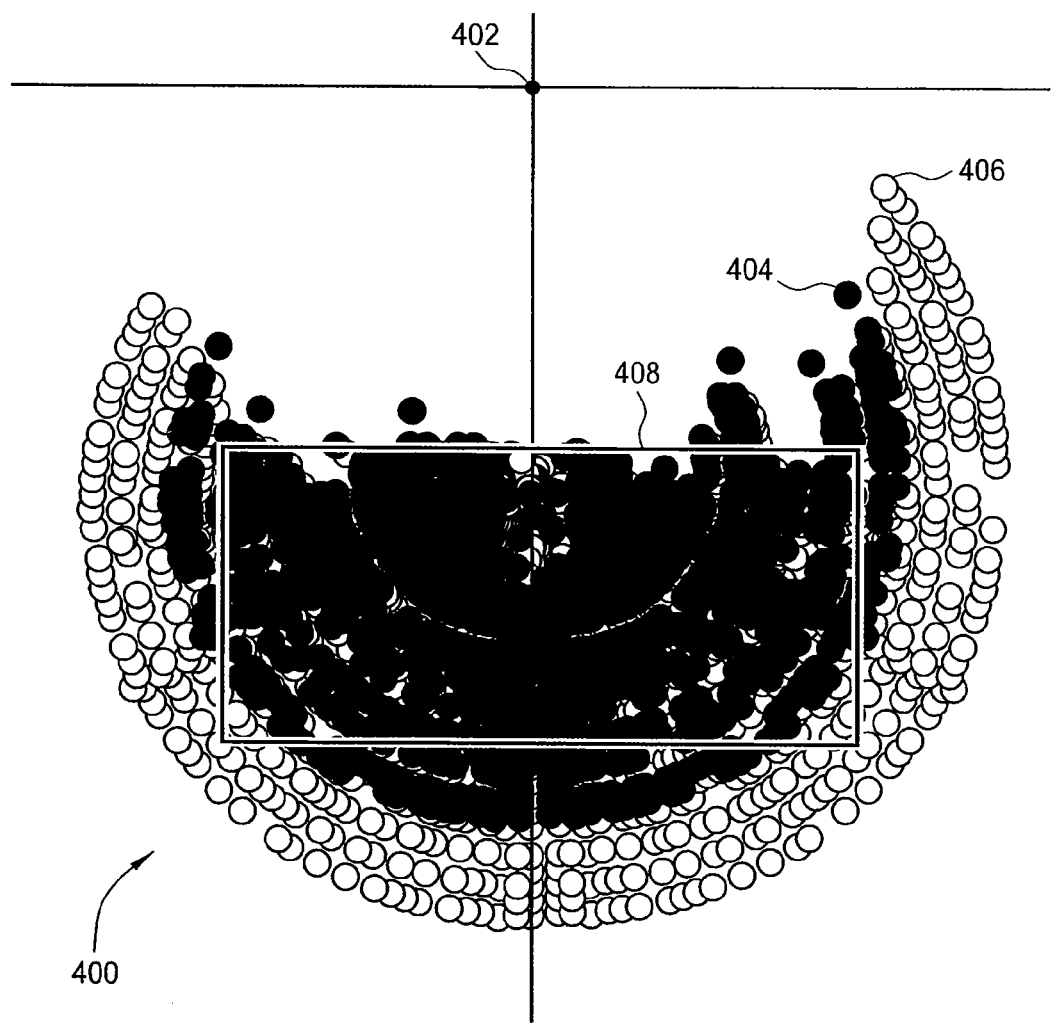
FIG. 4 is a screen shot illustrating a search space, according to one embodiment of the invention.

FIG. 4 is a screen shot illustrating a search space 400, according to one embodiment of the invention. As shown, the search space 400 includes a plurality of parametric motion datapoints representing locations where the final performed motion occurs after a transition from a locomotion motion. For example, each parametric motion datapoint in the search space may represent a final chair location after the character transitions from a walking motion space to a performed motion space of sitting down in a chair. To generate the search space 400, the rendering application may compute a sampling of footstep plans with parameters of stride length, curvature of path, and number of steps taken from an initial location 402. For example, solid parametric motion datapoints 404 may represent locations where a performed motion of sitting in the chair is initiated by pivoting on the right foot, and empty parametric motion datapoints 406 represent locations from where the performed motion of sitting in the chair is initiated by pivoting on the left foot. As shown, the empty parametric motion datapoints 406 extend further from the initial location 402 relative to the solid datapoints because the motion clips used to generate the search space 400 have a left-footed step as the last step in the motion clip. Since, by definition, each of the motion clips in the example locomotion motion space starts with a step on right foot and includes three cycles, ending on the left foot will necessarily place the character further away from the initial location 402 when transitioning to a performed motion sequence. Additionally, the search space 400 may include a "gap" where no pre-computed parametric motion datapoints are located. Such gaps may be a result of the motion clips used to parameterize the motion, where because of the data included in the original motion clips, no transitions from locations within the gaps are possible. The gap may be reduced or eliminated by using different motion clips to parameterize the motion plans into parametric motion datapoints.

Referring back now to FIG. 3, at step 308, the rendering application filters the search space to generate a behavioral gridmap. In one embodiment, the behavioral gridmap may specify parametric motion datapoints within a boundary region at which the final performed motion occurs. For example, in FIG. 4, the search space 400 may be filtered to generate a behavioral gridmap 408, which represents a boundary region of locations for executing the performed motion. In the example of executing the performed motion of sitting down in a chair, the boundary region may represent the four walls of a room in which a character executes the performed motion of sitting down in a chair. The parametric motion datapoints within the gridmap 408 approximate the possible locations at which a character may execute the performed motion, beginning on either the left or right foot, as described above. As will be apparent to those having ordinary skill in the art, the behavioral gridmap 408 does not have to be rectangular, but may have any shape, such as a circular behavioral gridmap with polar coordinate grid locations.

Figure 5:
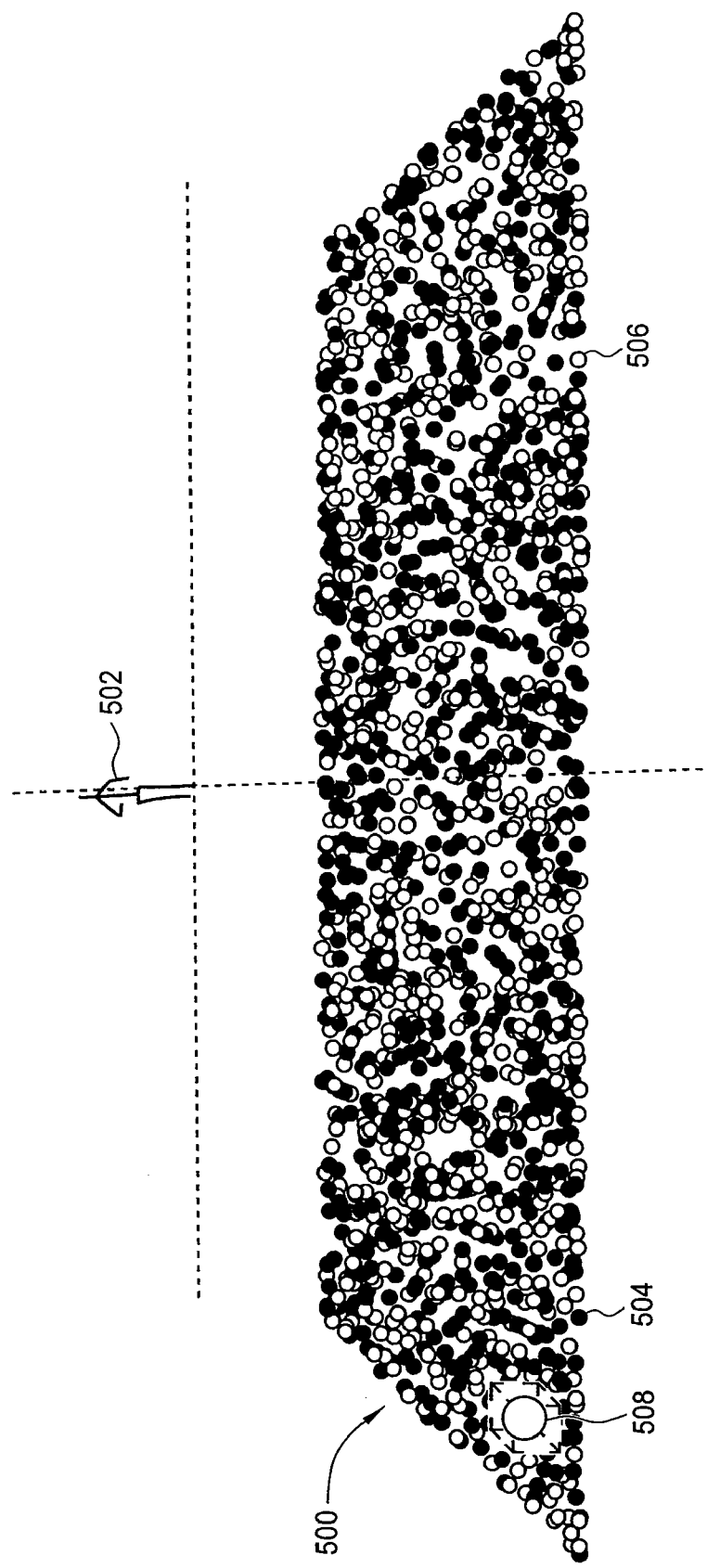
FIG. 5 is a screen shot illustrating a behavioral grid map, according to one embodiment of the invention.

FIG. 5 is a screen shot illustrating a behavioral grid map 500, according to one embodiment of the invention. As shown, the behavioral gridmap 500 includes a plurality of parametric motion datapoints at which a character 502 may execute the performed motion. In the example of transitioning from a walking motion space to a performed motion space where the character 502 sits down in a chair, solid parametric motion datapoints 504 represent locations where the performed motion is executed by pivoting on the right foot, and empty parametric motion datapoints 506 represent locations where the performed motion is initiated by pivoting on the left foot. Importantly, each parametric motion datapoint in the behavioral gridmap 500 is associated with the same orientation or rotation of initiating the performed motion relative to the approaching path direction. In other words, each parametric motion datapoint in the behavioral gridmap 500 is associated with a particular performed rotation as the character arrives at goal location 508. For example, each parametric motion datapoint in the behavioral gridmap 500 may be associated with a character initiating the performed motion of sitting down in a chair after approaching the chair head-on and rotating 180-degrees.

Referring back now to FIG. 3, at step 310, the rendering application determines whether search spaces that include parametric motion datapoints associated with motion plans for different rotations of the goal location relative to the path of approach are to be calculated. If so, then the method returns to step 306 to generate these additional search spaces and corresponding behavioral gridmaps, as described above. For example, a first search space may be computed for a goal location rotation of 0-degrees relative to the path direction (such as sitting down after stepping around a chair that is facing in the same direction as the path of approach), where the first search space is then filtered to generate a first behavioral gridmap. A second search space may be computed for a goal location rotation of 30-degrees, where the second search space is then filtered to generate a second behavioral gridmap. Additional search spaces may be computed in 30-degree increments to achieve search spaces covering 360-degrees of goal location rotation when executing the performed motion. The final angles of rotation are transformed and stored explicitly in the coordinate space of the behavioral gridmap. Given that the behavioral gridmaps cover a variation in angle relative to the path of approach for any given location, it follows that this variation also exists relative to coordinate space of the behavioral gridmap.

Additional search spaces may be calculated for initiating the performed motion on the opposite side of the character's body. For example, a first set of search spaces may be generated covering multiple rotations of executing the performed motion of sitting down in a chair while pivoting on the right foot. Then, a second set of search spaces may be generated for the sitting down performed motion while pivoting on the left foot. A behavioral gridmap may be filtered from each search space in the first and second sets of search spaces to achieve the final result of parametric motion datapoints scattered throughout a bounded region, representing goal locations for executing a performed motion, including multiple rotations of a goal location at which a performed motion is executed. When no additional goal location rotations are to be computed at step 310, the method 300 terminates.

Figure 6:
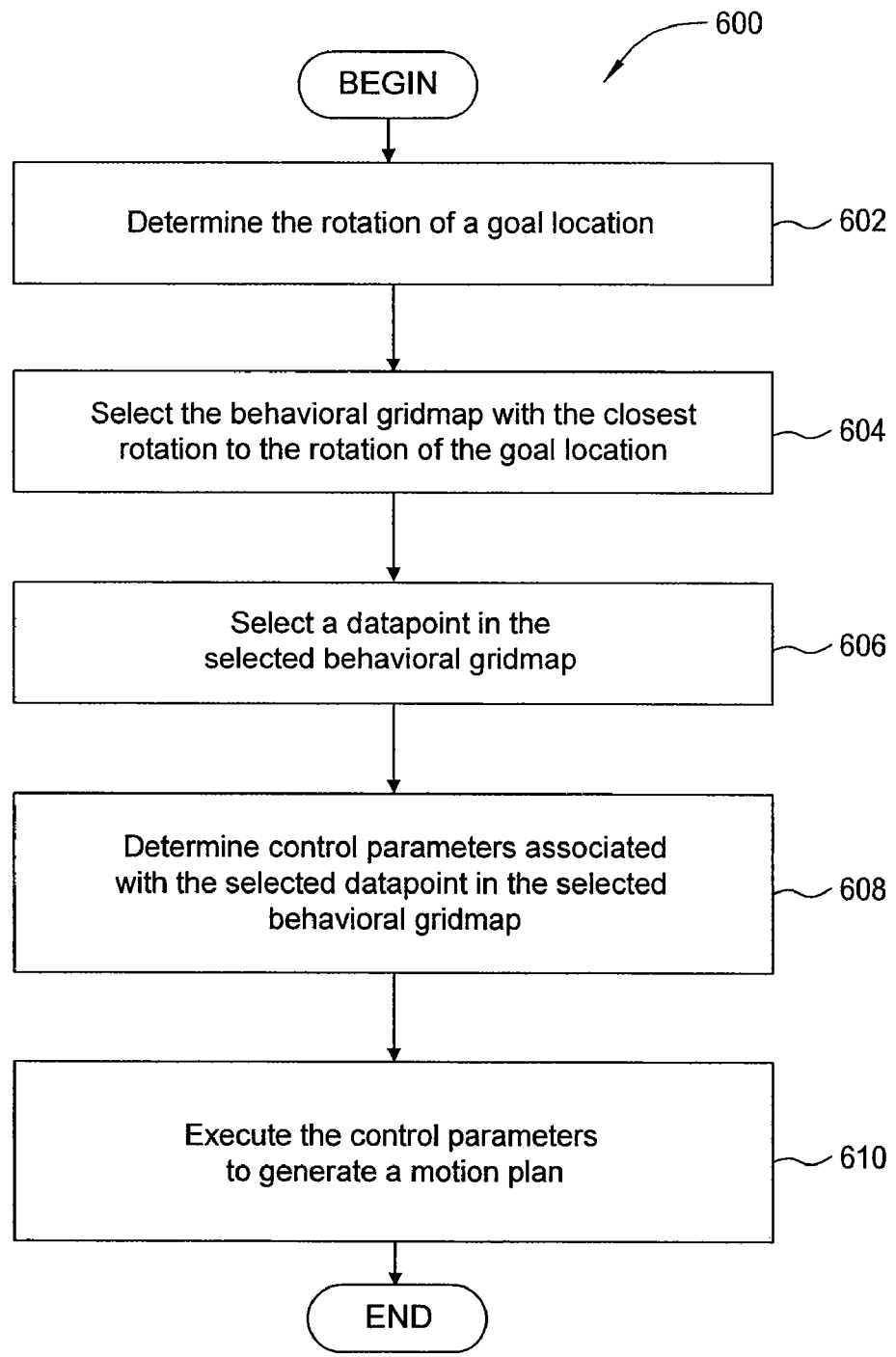
FIG. 6 is a flow diagram of method steps for generating a motion plan for a character, according to one embodiment of the invention.

FIG. 6 is a flow diagram of method steps for generating a motion plan for a character, according to one embodiment of the invention. Persons skilled in the art will understand that, even though the method is described in conjunction with the systems of FIGS. 1A, 1B, and 2, any system configured to perform the method steps, in any order, is within the scope of the present invention.

As shown, method 600 begins at step 602, where the rendering application determines the rotation of a goal location relative to a coordinate grid. The goal location may represent a location in a scene at which the character is to execute the performed motion. For example, the goal location may represent the location of a chair in which the character sits down. An exemplary goal location is illustrated in FIG. 5 as goal location 508.

At step 604, the rendering application selects the behavioral gridmap within a set of behavioral gridmaps generated for the rotation of the goal location determined at step 602. As described above with reference to steps 306 through 310 of FIG. 3, a different behavioral gridmap may be generated for each rotation of the goal location relative to the path of approach. For a given positional location in the behavioral gridmap, the datapoints from each rotational gridmap variation are compared against the goal rotation to select the closest rotation in the coordinate space of the behavioral gridmap. The behavioral gridmap selected from this set of behavioral gridmaps is the one generated for a specific rotation that best matches the rotation of the goal location. For example, if the rotation of the goal location is 73-degrees with respect a coordinate grid, then the behavioral gridmap with a datapoint rotation closest to 73-degree goal location rotation is selected.

At step 606, the rendering application selects a parametric motion datapoint in the selected behavioral gridmap. In one embodiment, each parametric motion datapoint is associated with pre-computed parameterized motion data for a character to follow a motion plan that moves the character to the location of the parametric motion datapoint in preparation for executing the performed motion. In the example of a walking character, each parametric motion datapoint within the selected behavioral gridmap may define a coordinated footstep plan that is parameterized by stride length, curvature of path, and number of steps that moves the character from an initial location to the transition location, and continues to a goal location where the character can then execute the performed motion sequence of sitting down in the chair.

At step 608, the rendering application determines control parameters associated with the selected parametric motion datapoint. For example, the control parameters may parameterize a coordinated footstep plan based on stride length, curvature of path, and number of steps. At step 610, the rendering application executes the control parameters to generate the motion plan. Again, as an example, the motion plan may be a coordinated footstep plan that begins at an initial location and ends at the final location of the selected parametric motion datapoint. Once the motion plan is generated, a performed motion sequence, having the appropriate orientation relative to the rotation of the goal location, may then be synthesized with the motion plan to create a final motion sequence. For example, the character may follow the coordinated footstep plan based on the control parameters associated with the selected parametric motion datapoint, which is associated with the goal location rotation, and then transition to the performed motion sequence. The method 600 may be repeated to generate different motion plans for different locations and rotations of the goal location.

Computing separate behavioral gridmaps directly for different goal location rotations, as described above in FIG. 3, can be computationally expensive, and storing all of the different behavioral gridmaps can consume valuable memory resources. Therefore, an alternative way of computing the transitions associated with various rotations of the goal location is provided in FIGS. 7-9 below.

Figure 7:
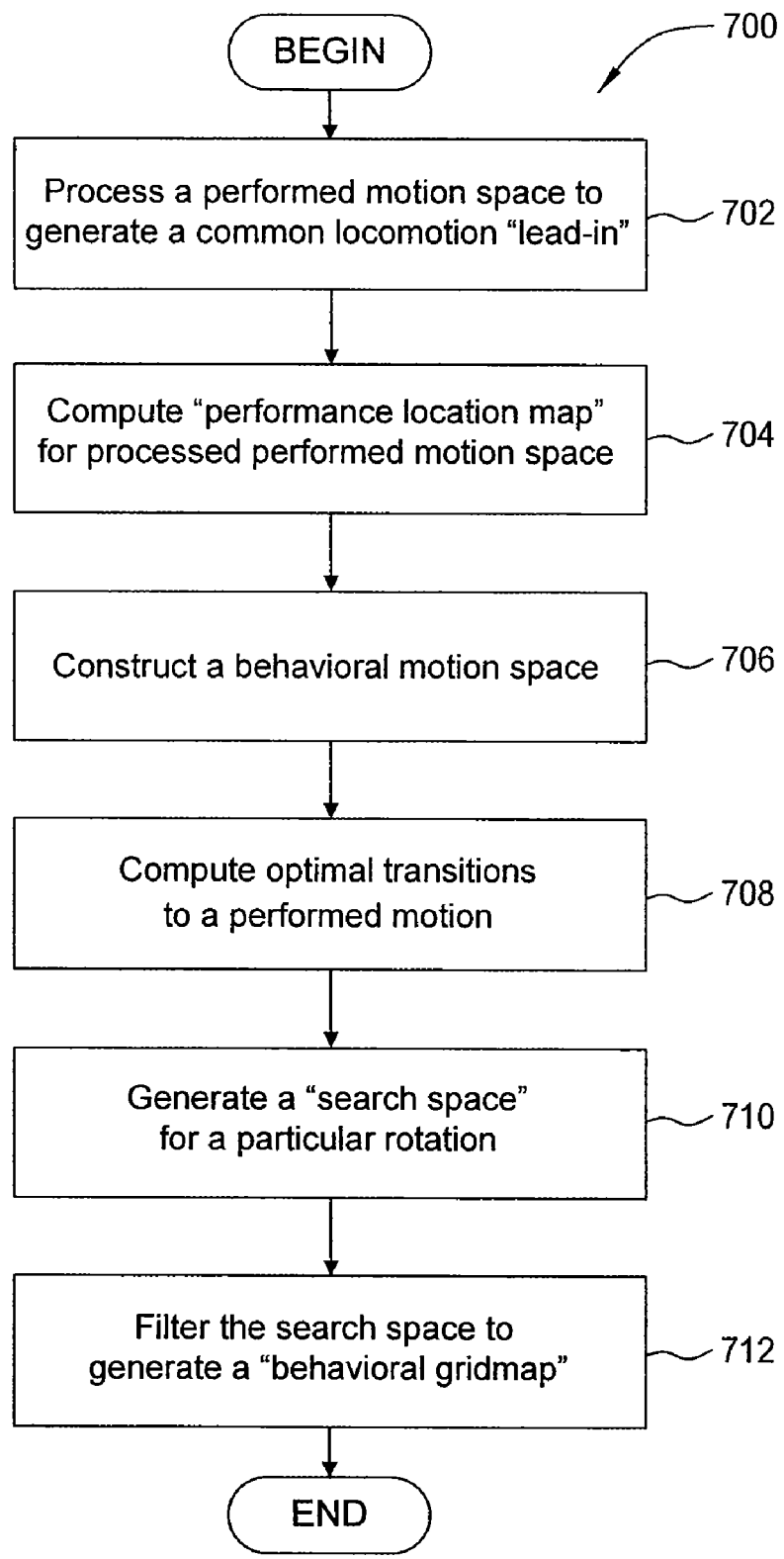
FIG. 7 is a flow diagram of method steps for generating a search space and one or more performance location maps for aligning a locomotion sequence with a performed motion, according to one embodiment of the invention.

FIG. 7 is a flow diagram of method steps for generating one or more performance location maps, according to one embodiment of the invention. Persons skilled in the art will understand that, even though the method is described in conjunction with the systems of FIGS. 1A, 1B, and 2, any system configured to perform the method steps, in any order, is within the scope of the present invention.

The method 700 begins at step 702, where the rendering application processes the performed motion space so that each of the motion clips used to generate the performed motion space begins with an identical locomotion "lead-in." For example, the performed motion space representing the act of sitting down in a chair may be processed so that the first twenty-five frames are identical for each motion clip in the performed motion space. The motion represented in those first twenty-five frames may be oriented to match a particular orientation of a motion path that transitions to a performed motion sequence at a specific transition location. After the lead-in of twenty-five frames, each motion clip may continue with the performed motion sequence and terminate with the execution of a performed motion. Each motion clip continues with the performed motion sequence in a slightly different fashion based on different rotations of the goal location. Thus, for the performed motion space of sitting down in a chair, after the twenty-five frame lead-in common to each motion clip used to generate the performed motion space, each motion clip may then depict the character following a path and sitting down in a chair based on a different rotation of the chair. Given that the transitions from the locomotion motion spaces will be registered to occur over the same overlapping "identical lead-in" motion segment in the performed motion space, the relative offsets in position and rotation between different variations in the performed motion will be the same for all of the parametric motion datapoints, regardless of the preceding path of approach of the locomotion.

At step 704, the rendering application computes a performance location map for the processed "identical lead-in" performed motion space. The performance location map for a particular parametric motion datapoint stores different locations and rotations of the goal location at which the performed motion is executed starting at the first frame of the "identical lead-in" locomotion segment. After the character has made the transition to the performed motion space from the locomotion motion space, the same lead-in portion is performed for each rotation, followed by the rotation-specific path to execute the performed motion. In one embodiment, this performance location map stores the relative positional and rotational coordinates of the final performed locations. This performance location map represents the relationship of how a final position of a performed motion changes as a function of rotation. The performance location map is associated with each parametric motion datapoint in the behavioral gridmap. Thus, the relationship defined by the performance location map is identical for each of the parametric motion datapoints in the search space subsequently generated at step 710 and the behavioral gridmap at step 712.

In one embodiment, steps 706 through 712 of method 700 are substantially the same as steps 302 through 308 of FIG. 3. Therefore, no additional description of steps 706 through 712 is provided herein.

Figure 8:
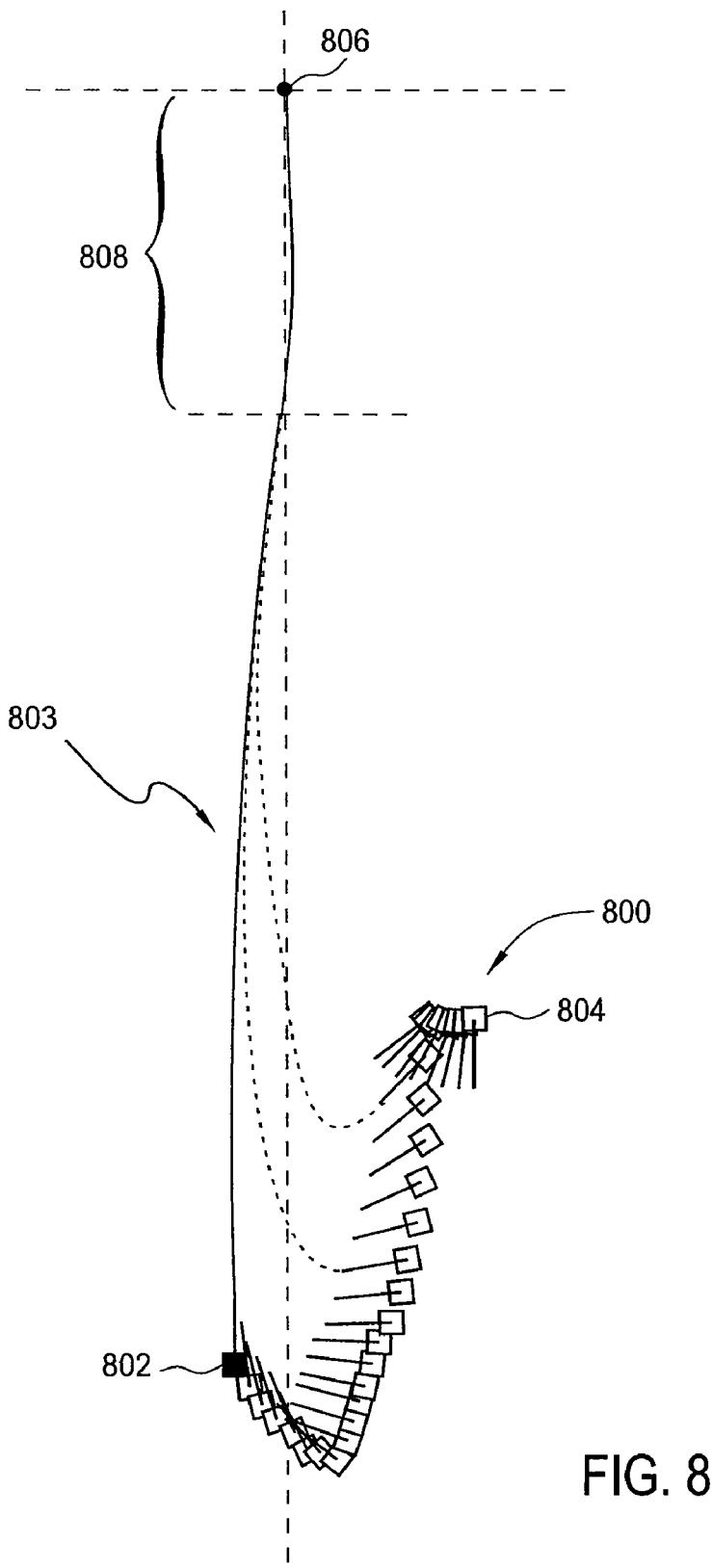
FIG. 8 is a screen shot illustrating a performance location map, according to one embodiment of the invention.

FIG. 8 is a screen shot illustrating a performance location map 800, according to one embodiment of the invention. As shown, the performance location map 800 includes thirty "performance locations" 802, 804 for executing a particular performed motion. For example, each of the performance locations 802, 804 may represent the location of a chair in which the character sits down. In such a scenario, a character would transition from the locomotion motion space to the performed motion space at transition point 806, execute a lead-in locomotion portion 808, and then sit down in the chair at one of the performance locations via a corresponding motion sequence 803 (where the lead-in locomotion portion 808 combined with one of the motion sequences 803 forms the performed motion). Any one of the performance locations may be the "root rotation" 802 from which other performance locations are derived. As described above, the lead-in locomotion portion 808, which represents the common frames among the motion clips making up the performed motion space, is identical for each performance location.

As also described above, the performance location map generated is the same for each parametric motion datapoint in the behavioral gridmap. Each performance location map that is generated at step 704 may be stored with its corresponding performed motion space. Any "performed motion grid" computed at a given performed motion rotation may be extended to all rotational and positional variation by applying the relative coordinate transforms of the performance location map. For example, a sitting down performance location map may be used to derive all rotational variations from a single behavioral gridmap (or search space) stored with only one of the variations, such as "sitting down in a chair after approaching the chair head-on and rotating 180-degrees." Thus, a single behavioral gridmap computed using a single selected performed motion rotation (such as 180-degrees), augmented by a performance location map, represents the combination of all of the rotational/positional performance location map variations for each parametric motion datapoint in the behavioral gridmap.

Figure 9:
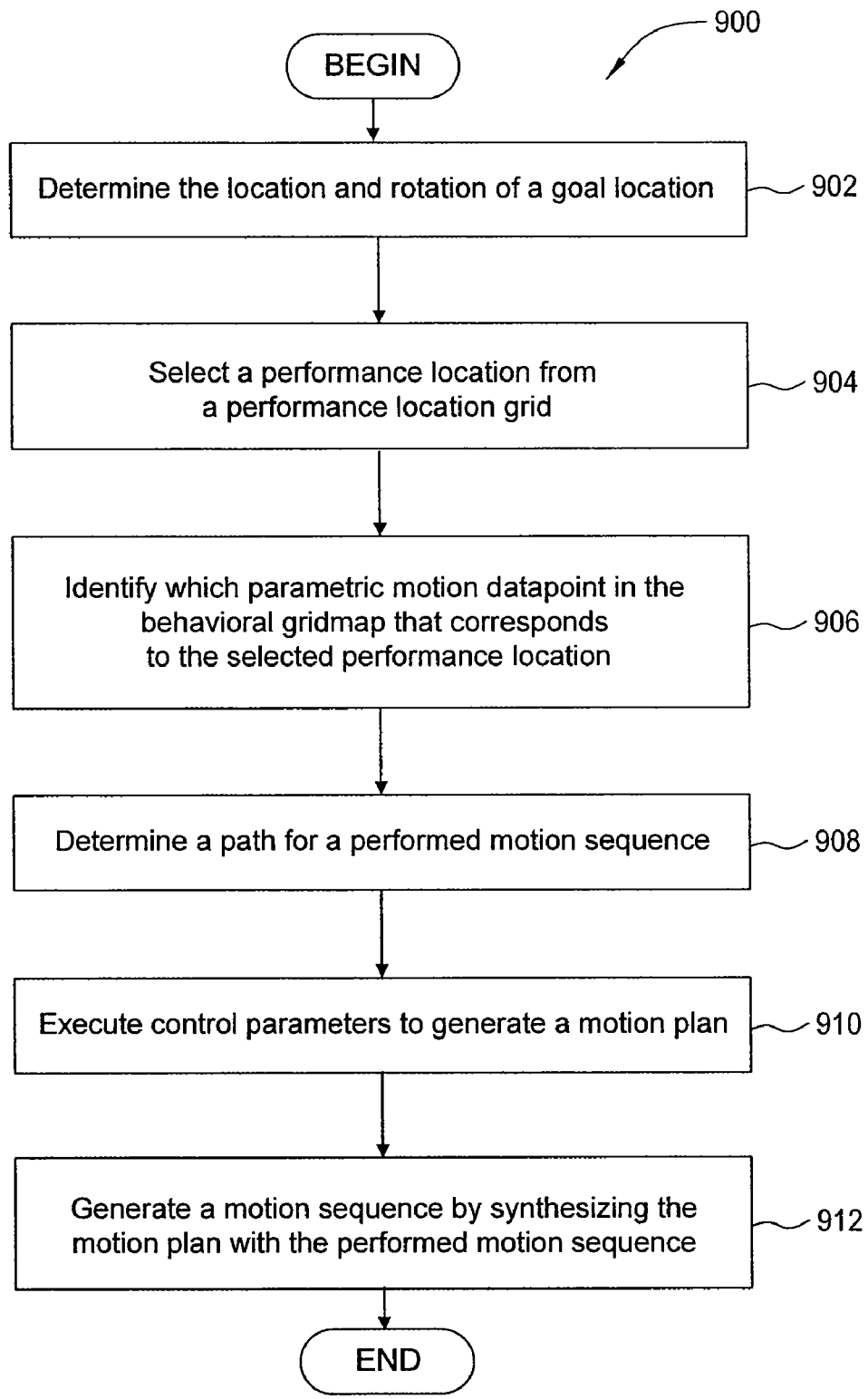
FIG. 9 is a flow diagram of method steps for a real-time phase of aligning a locomotion sequence with a performed motion, according to one embodiment of the invention.

FIG. 9 is a flow diagram of method steps for generating a motion sequence, according to one embodiment of the invention. Persons skilled in the art will understand that, even though the method is described in conjunction with the systems of FIGS. 1A, 1B, and 2, any system configured to perform the method steps, in any order, is within the scope of the present invention.

As shown, method 900 begins at step 902, where the rendering application determines a location and a rotation of a goal location. In one embodiment, the goal location represents a location in a scene at which the character executes the performed motion. For example, the goal location may represent the location of a chair, having a rotation (α) relative to a coordinate grid, in which the character sits down. An exemplary goal location is illustrated in FIG. 1B and denotes as goal location 156 with rotation (α) relative to coordinate grid 162.

At step 904, the rendering application selects a performance location from a performance location grid. As described above, at step 704 in FIG. 7, the same performance location map may be applied to derive rotational/positional variations of each parametric motion datapoint in the behavioral gridmap, and may be computed at only one of these variations. The performance location map represents different locations and rotations at which a performed motion is executed relative to a selected root rotation, such as sitting down in a chair after approaching the chair head-on and rotating 180-degrees. In one embodiment, the selection of the performance location is based on the location and the rotation of the goal location determined at step 902. For example, the selected performance location may be the performance location having the closest location and closest rotation relative to the location and the rotation of the goal location determined at step 902.

At step 906, the rendering application identifies the parametric motion datapoint in the behavioral gridmap that corresponds to the selected performance location. In one embodiment, the identification may be made by performing an inverse-transform from any of the performance location map variations, called location $V_i$ where i=1, 2, ..., N, with N locations) to a root rotation location $V_{root}$ of the particular performance location map. The rotation of $V_{root}$ corresponds to the specific rotational variation stored in the behavioral gridmap, such as, for example, sitting in a chair after pivoting at a 180-degrees rotation. In this fashion, the inverse-transform computes a transformation from the selected position/orientation $V_i$ of the character to the root location $V_{root}$ of the character. Since the pivot angle R of the root location $V_{root}$ matches the pivot angle of each of the parametric motion datapoints in the behavioral gridmap (for example, sitting down after pivoting 180-degrees), using the inverse-transform from the desired goal location $V_i$ determines the positional root offset and location of the parametric motion datapoint $D_k$ in the behavioral gridmap associated with the desired selected location for each $V_i$. At step 906, the rendering application computes the inverse-transform of each $V_i$ to find the $V_{root}$ with the root rotation R that is closest to the root rotation of mapped datapoint $D_k$ stored in the behavioral gridmap. Further, the parametric motion datapoint $D_k$ is associated with a motion plan that, when followed by the character, transitions to the performed motion with path and pivot angle of $V_k$ (rather than transitioning to the stored root location $V_{root}$ associated with datapoint $D_k$), and properly positions the character for transitioning to the performed motion sequence so that the character can ultimately execute the performed motion at the desired goal location. In other words, the motion plan only deviates from the stored root's $D_k$'s motion plan relative to the offset between $V_{root}$ and $V_k$ in the performance location map.

At step 908, the rendering application determines a path for the performed motion sequence, which begins at the transition from a blended locomotion motion space, continues to the final location of the identified parametric motion datapoint, and ends with the execution of a performed motion at the selected performance location. The path of the performed motion sequence may be determined based on the location of the identified parametric motion datapoint, the location and rotation of the selected performance location, and the inverse-transform calculated in step 906.

At step 910, the character executes the control parameters retrieved from the identified parametric motion datapoint to generate a motion plan. In one embodiment, step 910 is substantially similar to step 610 of FIG. 6 and therefore is not further described here.

At step 912, the rendering application generates a final motion sequence by combining the motion plan with the performed motion sequence. The final motion sequence begins with the motion plan generated at step 910, transitions to a performed motion sequence at the transition location identified by a parametric motion datapoint, follows the path of the performed motion sequence, and terminates with the execution of a performed motion at the performance location. Thus, the final motion sequence includes a locomotion portion, parameterized by control parameters, and a performed motion portion determined from the location and rotation of the performance location in a performed motion grid. As persons skilled in the art will appreciate, the method 900 may be repeated to generate different motion sequences for different locations and rotations of a goal location.

One advantage of the systems and methods described herein is that they provide a real-time solution to the problem of aligning a performed motion space with a locomotion motion space. By utilizing a look-up of pre-computed values for the parameterized control parameters organized in a behavioral gridmap, the rendering application may minimize the computational cost of finding a motion plan to move the character to a location to transition to a performed motion. Additionally, storage of the pre-computed footstep plans may be a fraction of the size of the motions themselves. Another advantage is that using performance location maps to solve for additional rotations of a goal location consumes relatively little storage space relative to storing multiple behavioral gridmaps representing additional rotations of the goal location. Thus, multiple rotations of performed motion alignment may also be calculated in real-time, without storing multiple behavioral gridmaps.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for generating a performance location map for aligning a locomotion sequence with a performed motion sequence, the method comprising:
    generating a performed motion space associated with a performed motion from a plurality of motion clips, wherein each motion clip in the performed motion space begins with a first locomotion portion of the performed motion that is identical for a number of frames;
    calculating a performance location map for the performed motion space, wherein the performance location map includes a transition location and a plurality of performance locations, wherein the transition location indicates a location in the performed motion where the first locomotion portion ends and a performed motion sequence portion of the performed motion begins, and wherein each performance location represents, for a different rotation of the performed motion, an ending location of the performed motion at which the performed motion sequence is executed;
    generating a behavioral gridmap, wherein the behavioral gridmap includes a plurality of parametric motion datapoints, wherein each parametric motion datapoint is associated with a motion plan defined by a set of control parameters and a root rotation for executing the performed motion; and
    associating the performance location map with each parametric motion datapoint in the behavioral gridmap.

2. The method of claim 1, wherein the motion represented by the first locomotion portion is oriented to match an orientation of a first motion plan.

3. The method of claim 1, wherein the step of generating the behavioral gridmap comprises:
    generating a behavioral motion space from a locomotion motion space and the performed motion space, wherein the locomotion motion space includes one or more motion clips depicting a character performing a periodic motion sequence, and each of the plurality of motion clips included in the performed motion space depicts the character performing the performed motion sequence;
    generating a set of registration curves representing transitions from the locomotion motion space to the performed motion space;
    generating a search space that includes a plurality of locations where the performed motion is executed; and
    filtering the search space to generate the behavioral gridmap.

4. The method of claim 3, wherein the locomotion motion space includes one or more motion clips depicting the character performing a walking motion.

5. The method of claim 4, wherein the control parameters associated with each parametric motion datapoint included in the behavioral gridmap include curvature of path and number of steps.

6. The method of claim 5, wherein each parametric motion datapoint included in the behavioral gridmap represents a final location for executing the first performed motion.

7. The method of claim 1, wherein each of the plurality of performance locations associated with the first performance location map is computed directly from the root rotation.

8. The method of claim 1, further comprising the step of combining each of the performance location maps associated with each of the parametric motion datapoints in the behavioral gridmap to generate a performed motion grid.

9. A non-transitory computer-readable medium storing instruction that, when executed by a processor, cause a rendering application to generate a performance location map for aligning a locomotion sequence with a performed motion sequence, by performing the steps of:
    generating a performed motion space associated with a performed motion from a plurality of motion clips, wherein each motion clip in the performed motion space begins with a first locomotion portion of the performed motion that is identical for a number of frames;
    calculating a performance location map for the performed motion space, wherein the performance location map includes a transition location and a plurality of performance locations, wherein the transition location indicates a location in the performed motion where the first locomotion portion ends and a performed motion sequence portion of the performed motion begins, and wherein each performance location represents, for a different rotation of the performed motion, an ending location of the performed motion at which the performed motion sequence is executed;
    generating a behavioral gridmap, wherein the behavioral gridmap includes a plurality of parametric motion datapoints, wherein each parametric motion datapoint is associated with a motion plan defined by a set of control parameters and a root rotation for executing the performed motion; and
    associating the performance location map with each parametric motion datapoint in the behavioral gridmap.

10. The computer-readable medium of claim 9, wherein the motion represented by the first locomotion portion is oriented to match an orientation of a first motion plan.

11. The computer-readable medium of claim 9, wherein the step of generating the behavioral gridmap comprises:
    generating a behavioral motion space from a locomotion motion space and the performed motion space, wherein the locomotion motion space includes one or more motion clips depicting a character performing a periodic motion sequence, and each of the plurality of motion clips included in the performed motion space depicts the character performing the performed motion sequence;
    generating a set of registration curves representing transitions from the locomotion motion space to the performed motion space;
    generating a search space that includes a plurality of locations where the performed motion is executed; and
    filtering the search space to generate the behavioral gridmap.

12. The computer-readable medium of claim 11, wherein the locomotion motion space includes one or more motion clips depicting the character performing a walking motion.

13. The computer-readable medium of claim 12, wherein the control parameters associated with each parametric motion datapoint included in the behavioral gridmap include curvature of path and number of steps.

14. The computer-readable medium of claim 13, wherein each parametric motion datapoint included in the behavioral gridmap represents a final location for executing the first performed motion.

15. The computer-readable medium of claim 9, wherein each of the plurality of performance locations associated with the first performance location map is computed directly from the root rotation.

16. The computer-readable medium of claim 9, further comprising the step of combining each of the performance location maps associated with each of the parametric motion datapoints in the behavioral gridmap to generate a performed motion grid.

17. A system for generating a performance location map for aligning a locomotion sequence with a performed motion sequence, the system comprising:
a processor; and
a memory, wherein the memory includes a program configured to:
generate a performed motion space associated with a performed motion from a plurality of motion clips, wherein each motion clip in the performed motion space begins with a first locomotion portion of the performed motion that is identical for a number of frames;
calculate a performance location map for the performed motion space, wherein the performance location map includes a transition location and a plurality of performance locations, wherein the transition location indicates a location in the performed motion where the first locomotion portion ends and a performed motion sequence portion of the performed motion begins, and wherein each performance location represents, for a different rotation of the performed motion, an ending location of the performed motion at which the performed motion sequence is executed;
generate a behavioral gridmap, wherein the behavioral gridmap includes a plurality of parametric motion datapoints, wherein each parametric motion datapoint is associated with a motion plan defined by a set of control parameters and a root rotation for executing the performed motion; and
associate the performance location map with each parametric motion datapoint in the behavioral gridmap.

18. The system of claim 17, wherein generating the behavioral gridmap comprises:
generating a behavioral motion space from a locomotion motion space and the performed motion space, wherein the locomotion motion space includes one or more motion clips depicting a character performing a periodic motion sequence, and each of the plurality of motion clips included in the performed motion space depicts the character performing the performed motion sequence;
generating a set of registration curves representing transitions from the locomotion motion space to the performed motion space;
generating a search space that includes a plurality of locations where the performed motion is executed; and
filtering the search space to generate the behavioral gridmap.

19. The system of claim 18, wherein the locomotion motion space includes one or more motion clips depicting the character performing a walking motion.

20. The system of claim 19, wherein the control parameters associated with each parametric motion datapoint included in the behavioral gridmap include curvature of path and number of steps.

* * * * *